(12) United States Patent
Liu et al.

(10) Patent No.: US 9,280,019 B2
(45) Date of Patent: Mar. 8, 2016

(54) SUBSTRATE WITH SPACER AND LIQUID CRYSTAL CELL CONTAINING THE SAME

(71) Applicant: Tianma Micro-Electronics Co., Ltd., Shenzhen (CN)

(72) Inventors: Xiaolin Liu, Shenzhen (CN); Jia Xie, Shenzhen (CN); Yongdong Zhang, Shenzhen (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 79 days.

(21) Appl. No.: 14/091,170

(22) Filed: Nov. 26, 2013

(65) Prior Publication Data
US 2015/0002794 A1 Jan. 1, 2015

(30) Foreign Application Priority Data

Jun. 26, 2013 (CN) .......................... 2013 1 0259702

(51) Int. Cl.
*G02F 1/1339* (2006.01)
*G02F 1/1333* (2006.01)
*G02F 1/1343* (2006.01)
*G02F 1/29* (2006.01)

(52) U.S. Cl.
CPC ...... *G02F 1/13394* (2013.01); *G02F 1/134309* (2013.01); *G02F 2001/294* (2013.01)

(58) Field of Classification Search
CPC ............ G02F 1/13394; G02F 1/13392; G02F 1/133512; G02F 1/1339; G02F 1/134363; G02F 1/1333; G02F 1/133305; G02F 1/133351

USPC .................................................. 349/155, 158
See application file for complete search history.

(56) References Cited

U.S. PATENT DOCUMENTS

| | | | |
|---|---|---|---|
| 6,208,402 B1 * | 3/2001 | Tajima .......................... | 349/156 |
| 2003/0156236 A1 * | 8/2003 | Yamada ........................ | 349/106 |
| 2004/0135959 A1 * | 7/2004 | Choi ............................. | 349/155 |
| 2012/0218490 A1 * | 8/2012 | Takama et al. ................. | 349/57 |

FOREIGN PATENT DOCUMENTS

| CN | 102819147 A | 12/2012 |
|---|---|---|
| EP | 2 503 787 A1 | 9/2012 |

OTHER PUBLICATIONS

European Search Report as issued in EP Application 13196290.4-1904 on Sep. 19, 2014.

* cited by examiner

*Primary Examiner* — Mike Qi
(74) *Attorney, Agent, or Firm* — Alston & Bird LLP (57) ABSTRACT

A device is disclosed. The device includes a substrate, and a plurality of spacers arranged on one side of the substrate. Each spacer has a cross section taken in a direction parallel with the substrate, where a size of the cross section of each spacer in a length direction is greater than a size of the cross section of each spacer in a width direction. In addition, an angle between the length direction of the cross section of the spacer and an X-direction of the substrate is greater than about 0° and less than about 90°, or greater than about 90° and less than about 180°.

10 Claims, 7 Drawing Sheets

SUBSTRATE WITH SPACER AND LIQUID CRYSTAL CELL CONTAINING THE SAME

CROSS-REFERENCES TO RELATED APPLICATIONS

The present application claims the benefit of priority to Chinese Patent Application No. 201310259702.7, entitled "SUBSTRATE WITH SPACER AND LIQUID CRYSTAL CELL CONTAINING THE SAME", filed with Chinese Patent Office on Jun. 26, 2013, the content of which is incorporated herein by reference in its entirety herein.

FIELD OF THE INVENTION

The present disclosure relates to the technical field of liquid crystal displays, and in particular to a substrate with spacers and a liquid crystal cell containing the same.

BACKGROUND OF THE INVENTION

Due to its advantages, such as light weight, thin thickness, low power consumption and low radiation, the liquid crystal cell has been widely used in various fields. The liquid crystal cell generally includes two substrates oppositely arranged, and a liquid crystal layer sandwiched between the two substrates. A voltage is applied across electrodes on the two substrates to align liquid crystal molecules in the liquid crystal layer under the control of an electric field and to control the transmission of light. In this way, an image is displayed. Spacers are provided between the two substrates so that the thickness of the liquid crystal cell between the two substrates is constant. Generally, some spacers are distributed between the two substrates, and columnar spacers are formed directly on the substrate.

Figure 1:
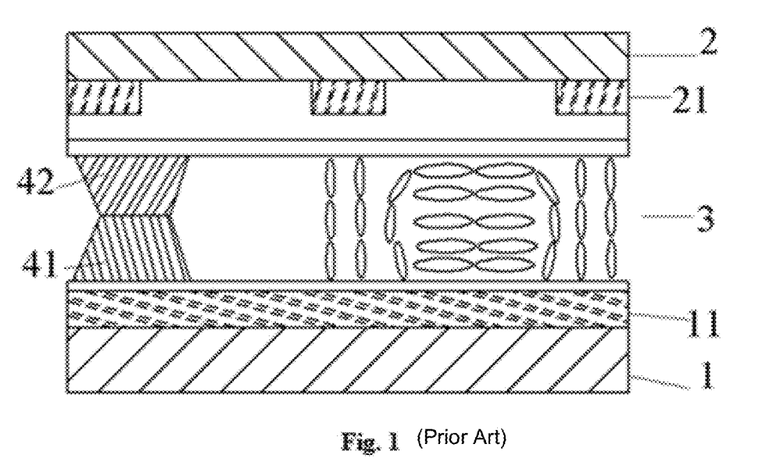
FIG. 1 is a cross sectional view of a liquid crystal cell in the prior art.
Figure 2A:
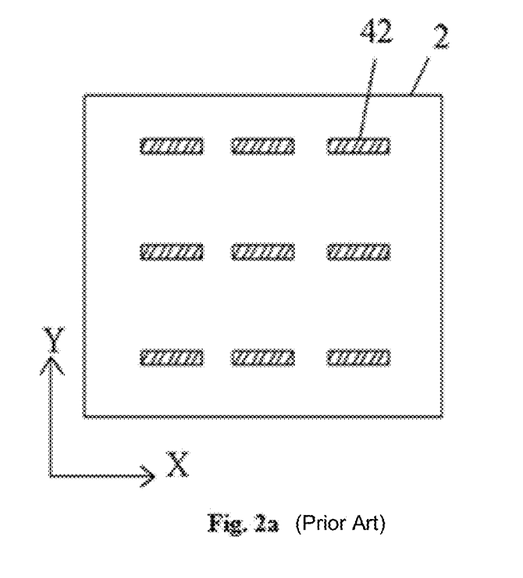
FIG. 2a, FIG. 2b and FIG. 2c are top views of the liquid crystal cell in the prior art.
Figure 2B:
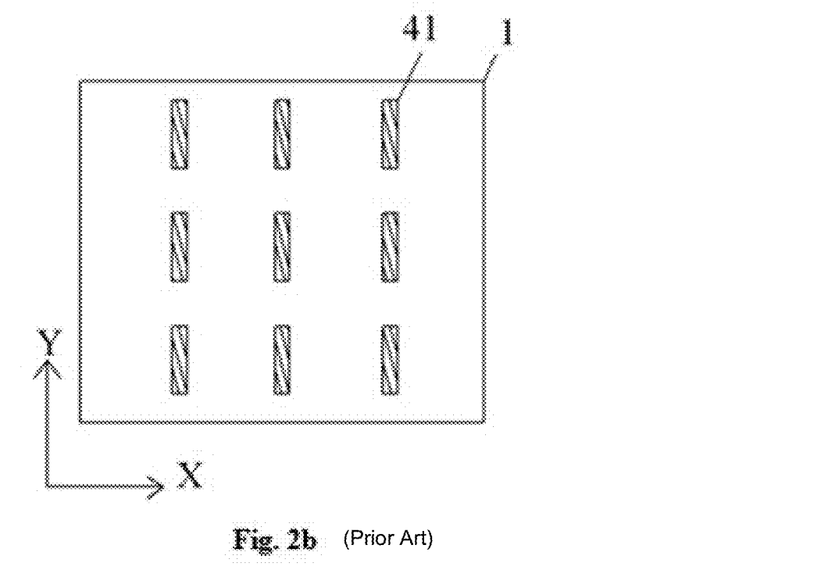
Figure 2C:
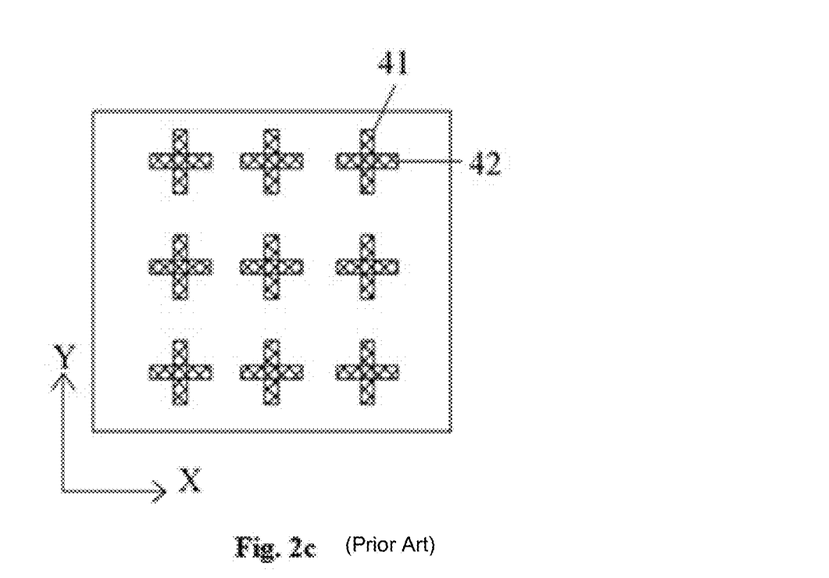

The liquid crystal cell in the prior art as shown in FIG. 1, FIG. 2a and FIG. 2b includes a first substrate 1, and a second substrate 2 provided to be opposite to the first substrate 1, a liquid crystal layer 3 formed between the first substrate 1 and the second substrate 2. A whole plane electrode 11 is formed on an entire surface of the first substrate 1, and strip electrodes 21 provided in parallel are formed on the second substrate 2. A first spacer 41 is provided on a side of the first substrate 1 facing to the liquid crystal layer, and a second spacer 42 is provided on a side of the second substrate 2 facing to the liquid crystal layer. The cross sections of the first spacer 41 and the second spacer 42, taken in a direction parallel with the first substrate 1 or the second substrate 2, are rectangular. Specifically, the length direction of the cross section of the first spacer 41 is parallel with an X direction of the first substrate 1 (i.e., an angle between the length direction of the cross section of the first spacer 41 and the X direction of the first substrate 1 is substantially 0° or substantially 180°), and the length direction of the cross section of the second spacer 42 is in parallel with a Y direction of the second substrate 2 (i.e., an angle between the length direction of the cross section of the second spacer 42 and an X direction of the second substrate 2 is substantially 90°). Further, in conjunction with FIG. 2c, when the first substrate 1 is bonded to the second substrate 2, the first spacer 41 is substantially perpendicular to and intersects the second spacer 42. In this way, the first substrate 1 and the second substrate 2 is supported to keep a certain distance between the first substrate 1 and the second substrate 2.

The spacers are provided on the first substrate 1 and the second substrate 2 of the above liquid crystal cell in respective directions in the prior art. Thus, two substrates need to be developed and exposed by using two masks respectively to form the first spacer 41 and the second spacer 42, thus increasing the complexity of the technology and the cost of production.

BRIEF SUMMARY OF THE INVENTION

One inventive aspect is a device. The substrate structure with the spacers includes a substrate, and a plurality of spacers arranged on one side of the substrate. Each spacer has a cross section taken in a direction parallel with the substrate, where a size of the cross section of each spacer in a length direction is greater than a size of the cross section of each spacer in a width direction. In addition, an angle between the length direction of the cross section of the spacer and an X-direction of the substrate is greater than about 0° and less than about 90°, or greater than about 90° and less than about 180°.

Another inventive aspect is a liquid crystal cell, including a first substrate, a second, and a liquid crystal layer formed between the first substrate and the second substrate. The cell also includes a plurality of spacers arranged on a side of the first substrate and a side of the second substrate, where each spacer has a cross section taken in a direction parallel with the first substrate and the second substrate, and a size of the cross section of each spacer in a length direction is greater than a size of the cross section of each spacer in a width direction. In addition, an angle between the length direction of the cross section of each spacer and an X-direction of the first and second substrates is greater than about 0° and less than about 90°, or greater than about 90° and less than about 180°, and where the spacers on the first substrate intersect with the spacers on the second substrate and keep a distance between the first substrate and the second substrate.

Another inventive aspect is a method for manufacturing a liquid crystal cell. The method includes preparing a first substrate and a second substrate, forming transparent material layers on the first substrate and the second substrate respectively, and patterning the transparent material layers to form spacers. Each of the spacers has a cross section taken in a direction parallel with the first substrate or the second substrate, and a size of the cross section of each spacer in a length direction is greater than a size of the cross section of each spacer in a width direction. In addition an angle between the length direction of the cross section of each spacer and an X-direction of the substrate is greater than about 0° and less than about 90°, or greater than about 90° and less than about 180°. The method also includes placing a liquid crystal on the second substrate, and bonding the first substrate to the second substrate to form the liquid crystal cell.

DETAILED DESCRIPTION OF THE INVENTION

Various technical solutions are described in conjunction with the drawings of the embodiments of the disclosure hereinafter. The described embodiments are only some of but not all the embodiments of the present invention. All the other embodiments obtained by those skilled in the art based on the embodiment in the present disclosure fall within the scope of protection of the present disclosure.

First Embodiment

Figure 3A:
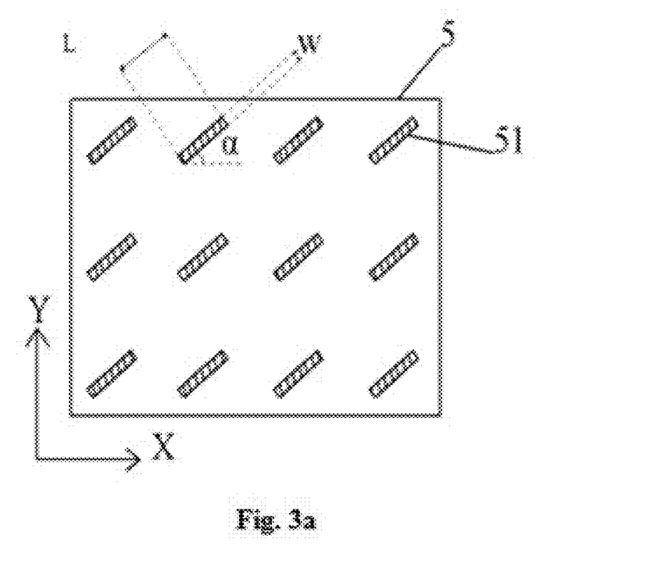
FIG. 3a and FIG. 3b are top views of a substrate structure according to a first embodiment of the disclosure.
Figure 3B:
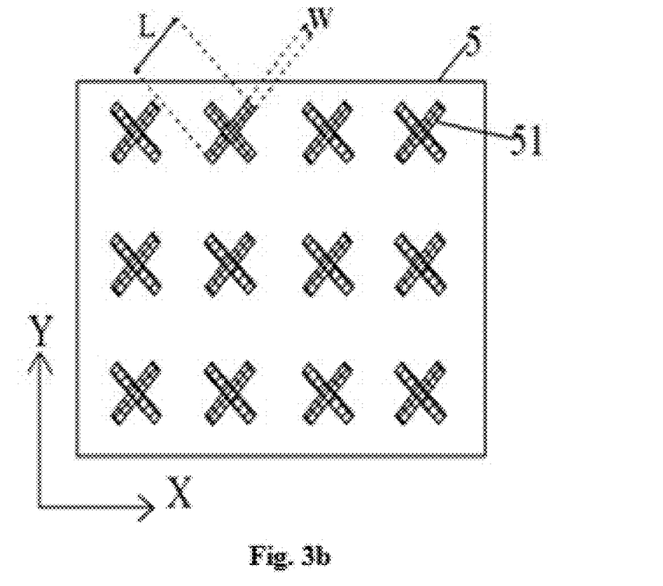

FIG. 3a and FIG. 3b are top views of a substrate structure according to a first embodiment of the disclosure. As shown in FIGS. 3a and 3b, a transparent substrate 5, such as a glass substrate, is prepared. Multiple spacers 51 are formed on the transparent substrate 5, which are arranged at a preset interval on one side of the transparent substrate 5. Generally, two spacers 51 may be provided, for example, in each square millimeter. Actually, the size of the spacer may be designed based on the size of the substrate and particular anti-pressure requirement. For a substrate with a great size (such as a substrate greater than 10 inches), due to its high anti-pressure requirement, the size of the spacer is designed to be great. The spacer 51 has a cross section taken in a direction parallel with the transparent substrate 5, and a size L of the cross section in a length direction is greater than a size W of the cross section in a width direction W, i.e., L>W. Specifically, in the embodiment, an angle α between the length direction of the cross section of the spacer and an X-direction of the transparent substrate 5 is about 45°. When two identical transparent substrates 5 are bonded, spacers 51 provided respectively on one side of the two transparent substrates 5 may have a one to one relationship, and opposite spacers may intersect and butt with each other, such that the two transparent substrates 5 are supported to keep a particular space between the two transparent substrates 5. Spacers on the two transparent substrates 5 have the same shape and direction, and thus spacers 51 on all the transparent substrate 5 may be fabricated using only one mask. Compared the solution of the invention with the prior art, it is avoided to fabricate spacers 51 with different patterns on the transparent substrate using multiple masks, thereby the cost of the production is reduced, the process for manufacturing the substrate is simplified, and the complexity of the technology is reduced.

The above solution is only one of the embodiments, and the angle α between the length direction of the cross section of the spacer and the X-direction of the transparent substrate 5 may also be about 135°. Further, the angle α between the length direction of the cross section of the spacer and the X-direction of the transparent substrate 5 may also be any angle greater than 0° and less than 90°, or greater than 90° and less than 180°, as long as when the two transparent substrates are bonded, spacers having one to one relationship may intersect and butt with each other to support the two transparent substrates. Considering the rotation error and bonding error when the transparent substrates are bonded, it may be beneficial that the angle between the length direction of the cross section of the spacer and the X-direction of the substrate is greater than about 10° and less than about 80°, or greater than about 100° and less than about 170°. Furthermore, it may be beneficial that the angle α between the length direction of the cross section of the spacer and the X-direction of the transparent substrate 5 is about 45° or about 135°. In this embodiment, the cross section of the spacer 51 is rectangular, and further, the long side of the cross section of the spacer 51 in the length direction may be in a wave shape or a fold line shape. The spacer 51 may be formed of photoreactive macromolecular transparent material.

Second Embodiment

Figure 4:
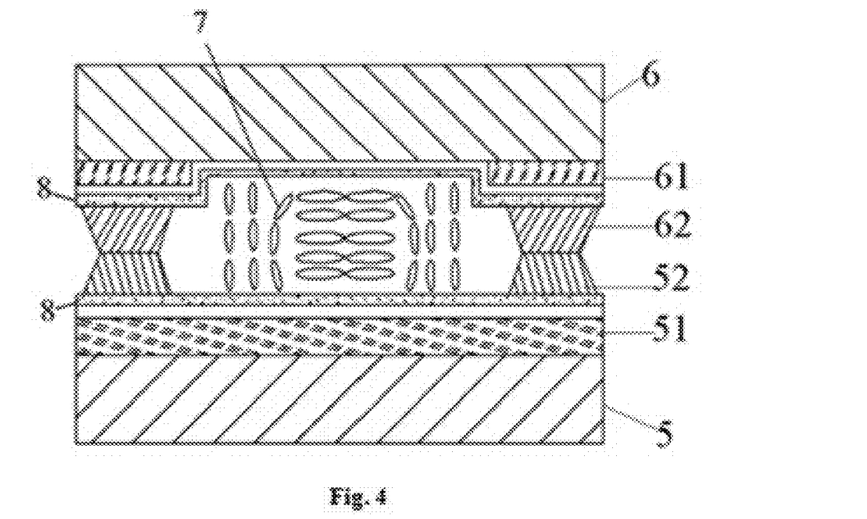
FIG. 4 is a cross sectional view of a liquid crystal cell according to a second embodiment of the disclosure.
Figure 5A:
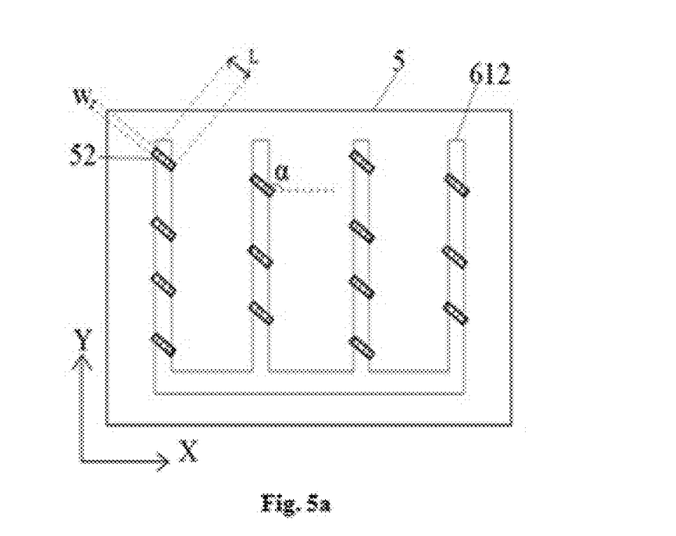
FIG. 5a, FIG. 5b and FIG. 5c are top views of the liquid crystal cell according to the second embodiment of the disclosure.
Figure 5B:
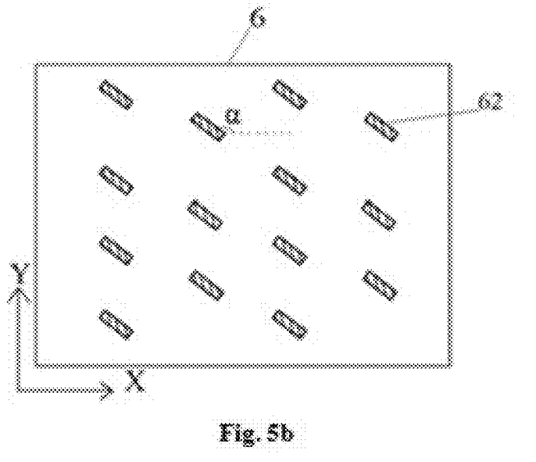

FIG. 4 is a cross sectional view of a liquid crystal cell according to a second embodiment of the disclosure. FIG. 5a and FIG. 5b are top views of the liquid crystal cell according to the second embodiment of the disclosure. As shown in FIG. 4, the liquid crystal cell includes a first substrate 5 and a second substrate 6 provided oppositely, and a liquid crystal layer 7 formed between the first substrate 5 and the second substrate 6. The first electrode 51 is a whole plane transparent electrode, and is formed on the side of the first substrate 5 that is close to the liquid crystal layer 7. The material of the first electrode 51 may be tin indium oxide. In conjunction with FIG. 5a, the second electrode 61 is a transparent electrode in a comb shape, which includes one end 611 and multiple comb tooth parts 612. The second electrode 61 is formed on a side of the second substrate 6 that is close to the liquid crystal layer 7. The first electrode 51 and the second electrode 61 are provided oppositely. If different voltages are applied across adjacent comb tooth parts 612, a voltage difference will occur between adjacent comb tooth parts 612 of the first electrode 51 to generate an electric field. The orientations of liquid crystal molecules in the liquid crystal layer 7 will be varied under the action of the electric field. The liquid crystal molecules in different regions have different rotation angles, so that the refractive index of the liquid crystal molecules is varied in substantially a parabola, and a liquid crystal lens is formed between adjacent comb tooth parts 612 of the second electrode 61.

In conjunction with FIG. 4, FIG. 5a and FIG. 5b, the second spacers 62 are arrayed at a preset interval on the side of the second substrate 6 that is close to the liquid crystal layer 7. Specifically, the second spacers 62 are provided at the borders of the liquid crystal lens that is formed by the comb tooth part 612 of the second electrode 61. The second spacer 62 has a cross section taken in a direction parallel with the second substrate 6, and a size L of the cross section of the second spacer 62 in a length direction is greater than a size W of the cross section of the second spacer 62 in a width direction, i.e., L>W. Further, an angle α between the length direction of the cross section of the second spacer 62 and the X-direction of the second substrate 6 is 45°. The first spacers 52 on the first substrate 5 is also provided on the side of the first substrate 5 that is close to the liquid crystal layer 7. The position of the spacers 52 have an one to one relationship with that of the spacers 62, and the spacers 52 are also provided at the border of the liquid crystal lens. The first spacer 52 has a cross section taken in a direction parallel with the first substrate 5. A size L of the cross section of the first spacer 52 in a length direction is greater than A size W of the cross section of the first spacer 52 in a width direction, i.e., L>W. Similarly, an angle α between the length direction of the cross section of the first spacer 52 and the X-direction of the first substrate 5 is also about 45°. Both the cross section of the first spacer 52 taken in the direction parallel with the first substrate 5 and the cross section of the second spacer 62 taken in the direction parallel with the second substrate 6 are in the shape of a rectangular. Practically, the long sides of the cross sections of the first spacer 52 and the second spacer 62 in the length direction may be in a wave shape or a folded line shape, as shown. Further, to avoid the scattering problem caused by a refractive index difference between the first and second spacers 52 and 62 and the liquid crystal layer 7, the first spacer 52 and the second spacer 62 may be provided to overlap with the comb tooth part 612 of the second electrode 61. The first spacer 52 and the second spacer 62 may be formed of photoreactive macromolecular transparent material.

Figure 5C:
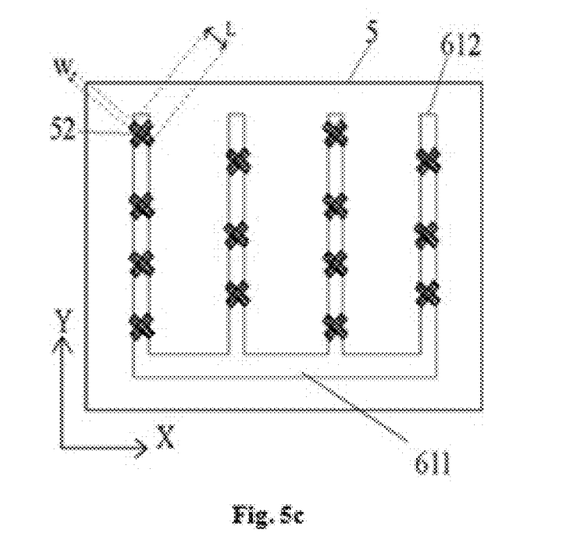

Further, in conjunction with FIG. 5c and FIG. 4, the first spacer 52 on the first substrate 5 and the second spacer 62 on the second substrate 6 are provided oppositely to intersect and butt with each other, so as to keep a distance between the first substrate 5 and the second substrate 6. The first spacer 52 and the second spacer 62 have a length of ½ d, where d is the distance between the first substrate 5 and the second substrate 6. Considering the manufacturing accuracy of the first spacer 52 and the second spacer 62, it is beneficial to ensure that the height sum of the first spacer 52 and the second spacer 62 is not less than d. Generally, the size of the spacer needs to be designed based on the size of the substrate and specific anti-pressure requirement. For a substrate with a great size (such as a substrate with a size greater than 10 inches), due to its high anti-pressure requirement, the size of the spacer is designed to be relatively large. Further, for the substrate with large PPI (the number of the sub-Pixel Per Inch), due to its intensive arrangement of the sub-pixel, the size of the spacer is designed to be relatively small. An alignment layer 8 is formed on the inner surfaces of the first substrate 5 and the second substrate 6 that are closest to the liquid crystal layer 7, which is adapted to orientate the liquid crystal molecules in an initial state uniformly. The alignment layer 8 may be formed of polyimide. The first spacer 52 on the first substrates 5 and the second spacer 62 on the second substrate 6 have the same shape, direction and position, thus all the first spacers 52 on the first substrates 5 and the second spacers 62 on the second substrate 6 may be fabricated using only one mask. Compared the solution of the present application with the prior art, it is avoided to fabricate spacers with different patterns on the transparent substrates using multiple masks, such that the cost of the production is reduced, the process of manufacturing the substrate is simplified, and the complexity of the process is reduced.

The angle α between the length direction of the cross section of the first spacer 52 and the X-direction of the first substrate 5, or the angle α between the length direction of the cross section of the second spacer 62 and the X-direction of the second substrate 6 is only an example, and may also be about 135°. Further, the angle α between the length direction of the cross section of the first spacer 52 and the X-direction of the first substrate 5, or the angle α between the length direction of the cross section of the second spacer 62 and the X-direction of the second substrate 6 may also be any angle greater than about 0° and less than about 90°, or greater than about 90° and less than about 180°, as long as when the first substrate 5 or the second substrate 6 are bonded to each other, the first spacer 52 and the second spacer 62 with the one to one relationship are able to intersect and butt with each other to support the two transparent substrates. Considering the rotation error and bonding error when the transparent substrates are bonded, it may be beneficial that the angle between the length direction of the cross section of the spacer and the X-direction of the substrate is greater than about 10° and less than about 80°, or greater than about 100° and less than about 170°. The angle α between the length direction of the cross section of the first spacer 52 and the X-direction of the first substrate 5 or the angle α between the length direction of the cross section of the second spacer 62 and the X-direction of the second substrate 6 may be about 45° or about 135°.

The first electrode with the above shape is only one of the embodiments, and the first electrode 51 may also be a transparent electrode in a comb shape and is provided correspondingly to the second electrode 61.

A method for manufacturing a liquid crystal cell according to an embodiment includes: forming transparent conductive layers respectively on a first substrate and a second substrate, where the material of the transparent conductive layer may be such as tin indium oxide; patterning the transparent conductive layers to form a first electrode and a second electrode; forming transparent material layers respectively on the first electrode and the second electrode; patterning the transparent material layers to form first spacers on the first substrate and second spacers on the second substrate. Specifically, the transparent material layer may be formed of photoreactive macromolecular transparent material. The first spacer may have a cross section in a direction parallel with the first substrate; and the second spacer may have a cross section in a direction parallel with the second substrate. A size L of the cross section in a length direction may be greater than a size W thereof in a width direction, i.e., L>W. The cross section may be in the shape of rectangular, or the long side of the cross section in the length direction may be in a wave shape or a fold line shape. Further, the angle between the length direction of the cross section and the X-direction of the first or second substrate is greater than about 0° and less than about 90°, or greater than about 90° and less than about 180°. Considering the rotation error and bonding error when the first substrate and the second substrate are bonded to each other, it may be beneficial that the angle between the length direction of the cross section of the spacer and the X-direction of the substrate is greater than about 10° and less than about 80°, or greater than about 100° and less than about 170°, and it may be beneficial that the angle α between the length direction of the cross section of the spacer and the X-direction of the substrate is about 45° or about 135°.

Then, alignment layers are formed on the first substrate and the second substrate, which is adapted to orientate the liquid crystal molecules in an initial state uniformly. The alignment layer may be formed of polyimide.

Next, liquid crystal is drop onto the second substrate, and the first substrate is inverted and bonded to the second substrate, to form a liquid crystal cell. Specifically, the first spaces and the second spacers are provided in the one to one relationship, which intersect and butt with each other, to support the two transparent substrates.

Third Embodiment

Figure 6:
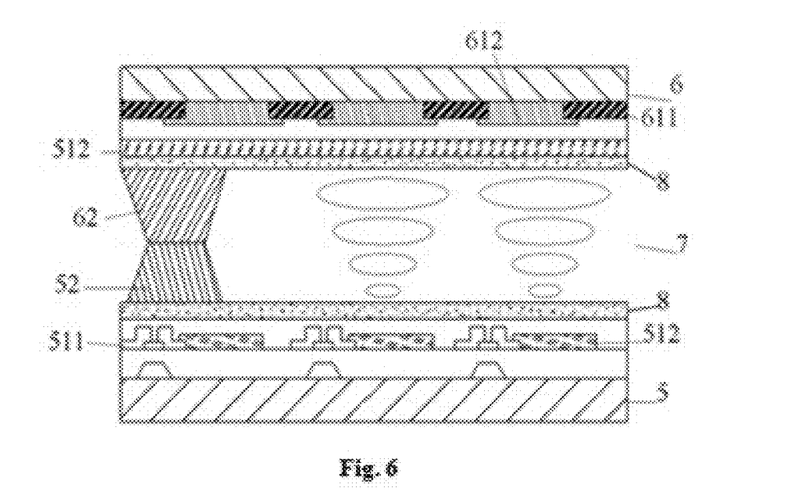
FIG. 6 is a cross sectional view of a liquid crystal cell according to a third embodiment of the disclosure.

FIG. 6 is a cross sectional view of a liquid crystal cell according to a third embodiment of the disclosure. As shown in FIG. 6, the liquid crystal cell includes a first substrate 5 and a second substrate 6 provided oppositely, and a liquid crystal layer 7 formed between the first substrate 5 and the second substrate 6. The first substrate 5 is an array substrate, multiple thin film transistors 511 and pixel electrodes 512 are formed on a side of the first substrate 5 close to the liquid crystal layer 7. First spacers 52 are arranged at a preset interval on the first substrate 5. The second substrate 6 is a color filer substrate, and a black matrix 611 and a color resist 612 are formed on a side of the second substrate 6 close to the liquid crystal layer 7. Specifically, the black matrix 611 corresponds to the thin film transistor 511 on the first substrate 5 and serves to shelter, and second spacers 62 are provided on the region in which the black matrix 611 of the second substrate 6 is located.

Figure 7A:
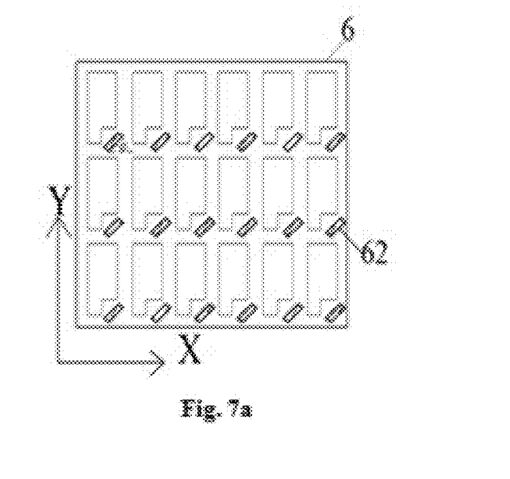
FIG. 7a, FIG. 7b and FIG. 7c are top views of the liquid crystal cell according to the third embodiment of the disclosure.
Figure 7B:
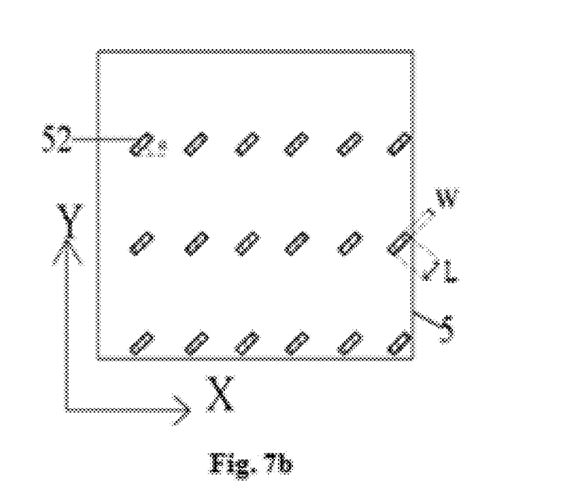

FIG. 7a and FIG. 7b are top views of the liquid crystal cell according to the third embodiment of the disclosure. In conjunction with FIG. 7a and FIG. 7b, the first spacers 52 and the second spacers 62 are provided in the one to one relationship, which intersect and butt with each other, to keep a distance between the first substrate 5 and the second substrate 6. Specifically, the first spacer 52 has a cross section taken in a direction parallel with the first substrate 5. A size L of the cross section of the first spacer 52 in a length direction is greater than a size W thereof in a width direction, i.e., L>W. Further, an angle α between the length direction of the cross section of the first spacer 52 and the X-direction of the first substrate 5 is about 45°. The second spacer 62 has a cross section taken in a direction parallel with the second substrate 6. A size L of the cross section of the second spacer 62 in a length direction is greater than a size W thereof in a width direction, i.e., L>W. Similarly, an angle α between the length direction of the cross section of the second spacer 62 and the X-direction of the second substrate 6 is also about 45°. In this embodiment, the cross section of the first spacer 52 or the second spacer 62 taken in the direction parallel with the first substrate 5 or the second substrate 6 has a shape of rectangular. Practically, the long side of the cross sections of the first spacer 52 and the second spacer 62 in the length direction may be in a wave shape or a fold line shape. Further, to avoid the scattering problem caused by the refractive index difference between the first and second spacers 52 and 62 and the liquid crystal layer 7, the first spacer 52 and the second spacer 62 may be provided to correspond to the position of the black matrix 611. The first spacer 52 and the second spacer 62 may be formed of photoreactive macromolecular transparent material.

Figure 7C:
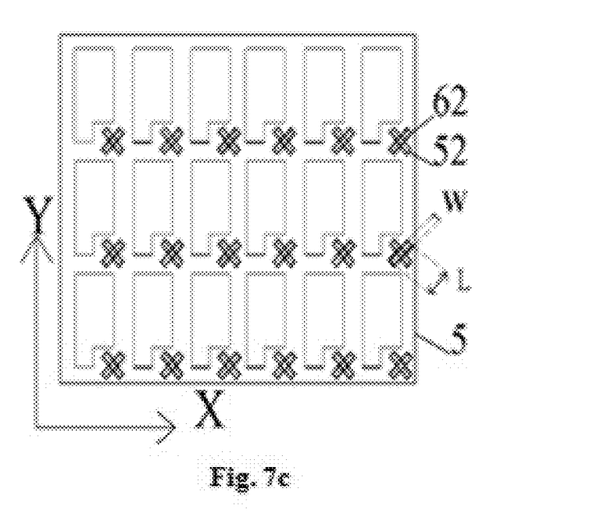

Further, in conjunction with FIG. 7c and FIG. 6, the first spacer 52 and the second spacer 62 are provided oppositely on the first substrate 5 and the second substrate 6, which intersect and butt with each other, so as to keep a distance between the first substrate 5 and the second substrate 6. The first spacer 52 and the second spacer 62 have a height of ½ d, where d is the distance between the first substrate 5 and the second substrate 6. Considering the accuracy of manufacturing the first spacer 52 and the second spacer 62, it needs to be ensured that the height sum of the first spacer 52 and the second spacer 62 is not less than d. Generally, the size of the spacer needs to be designed based on the size of the substrate and specific anti-pressure requirement. For a substrate with a great size (such as a substrate with a size greater than 10 inches), due to its high anti-pressure requirement, the size of the spacer is designed to be relatively great. Further, for the substrate with high PPI (the number of the sub-Pixel Per Inch), due to the intensive arrangement of the sub-pixel, the size of the spacer is designed to be relatively small. Alignment layers 8 is formed on the inner surfaces of the first substrate 5 and the second substrate 6 that are closest to the liquid crystal layer 7, which is adapted to orientate the liquid crystal molecules in an initial state uniformly. The alignment layer 8 may be formed of polyimide. The first spacer 52 on the first substrates 5 and the second spacer 62 on the second substrate 6 have the same shape, direction and position, such that all the first spacers 52 on the first substrates 5 and the second spacers 62 on the second substrate 6 may be fabricated using only one mask. Compared the solution of the invention with the prior art, it is avoided to fabricate spacers with different patterns on the transparent substrates using multiple masks, such that the cost of the production is reduced, the process of manufacturing the substrate is simplified, and the complexity of the process is reduced.

The above angle α between the length direction of the cross section of the first spacer 52 and the X-direction of the first substrate 5, or the angle α between the length direction of the cross section of the second spacer 62 and the X-direction of the second substrate 6 is only an example, and may also be about 135°. Further, the angle α between the length direction of the cross section of the first spacer 52 and the X-direction of the first substrate 5, or the angle α between the length direction of the cross section of the second spacer 62 and the X-direction of the second substrate 6 may also be any angle greater than about 0° and less than about 90°, or greater than about 90° and less than about 180°, as long as when the first substrate 5 and the second substrate 6 are bonded, the first spacer 52 and the second spacer 62 in the one to one relationship are able to intersect and butt with each other to support the two transparent substrates. Considering the rotation error and bonding error when the transparent substrates are bonded, it may be beneficial that the angle between the length direction of the cross section of the spacer and the X-direction of the substrate is greater than about 10° and less than about 80°, or greater than about 100° and less than about 170°. It may be beneficial that the angle α between the length direction of the cross section of the first spacer 52 and the X-direction of the first substrate 5, or the angle α between the length direction of the cross section of the second spacer 62 and the X-direction of the second substrate 6 is about 45° or about 135°.

A method for manufacturing a liquid crystal cell according to another embodiment includes: forming a thin film transistor and a pixel electrode on a first substrate, where the pixel electrode is formed of transparent conductive material such as tin indium oxide; forming a transparent material layer on the thin film transistor and the pixel electrode; patterning the transparent material layer to form a first spacer on the first substrate; forming a black matrix and a color resist on the second substrate; forming a transparent material layer on the black matrix and the color resistor; and patterning the transparent material layer to form a second spacer on the second substrate, in which the second spacer is provided in the region in which the black matrix is located. The transparent material layer may be formed of photoreactive macromolecular transparent material. The first spacer has a cross section taken in the direction parallel with the first substrate, while the second spacer has a cross section taken in the direction parallel with the second substrate. A size L of the cross section in a length direction is greater than a size W thereof in a width direction, i.e., L>W. The cross section may be rectangular, or the long side of the cross section in the length direction is in a wave shape or a fold line shape, as shown. Further, the angle between the length direction of the cross section and the X-direction of the first or second substrate is greater than about 0° and less than about 90°, or greater than about 90° and less than about 180°. Considering the rotation error and bonding error when the first substrate and the second substrate are bonded to each other, it may be beneficial that the angle between the length direction of the cross section of the spacer and the X-direction of the substrate is greater than about 10° and less than about 80°, or greater than about 100° and less than about 170°. It may be beneficial that the angle α between the length direction of the cross section of the spacer and the X-direction of the substrate is about 45° or about 135°.

Then, alignment layers are formed on the first substrate and the second substrate, which is adapted to orientate the liquid crystal molecules in an initial state uniformly. The alignment layer may be formed of polyimide.

Next, liquid crystal is drop onto the second substrate, and the first substrate is inverted and bonded to the second substrate, to form a liquid crystal cell. Specifically, the first spaces and the second spacers are provided in the one-to-one relationship, which intersect and butt with each other, to support the two transparent substrates.

A substrate having a spacer, a liquid crystal cell containing the substrate, and a method for manufacturing the liquid crystal cell according to various embodiments have been described above. Specific examples are adopted herein to describe the principles and embodiments of the disclosure. The above embodiments are only intended to facilitate understanding. Modifications can be made to the embodiments and the application scope by those skilled in the art based on the idea of the disclosure.

What is claimed is:

1. A liquid crystal cell, comprising:
    a first substrate;
    a second substrate;
    a liquid crystal layer formed between the first substrate and the second substrate; and
    a plurality of spacers arranged on a side of the first substrate and a side of the second substrate, wherein the plurality of spacers on the first substrate and the second substrate are formed by a same mask, and each spacer has a cross section taken in a direction parallel with the first substrate and the second substrate, wherein a size of the cross section of each spacer in a length direction is greater than a size of the cross section of each spacer in a width direction, and an angle between the length direction of the cross section of each spacer and an X-direction of the first and second substrates is greater than about 0° and less than about 90°, or greater than about 90° and less than about 180°, and wherein the spacers on the first substrate intersect with the spacers on the second substrate and keep a distance between the first substrate and the second substrate,
    wherein a second electrode comprises one end and a plurality of comb tooth parts, and the second electrode is formed on a side of the second substrate that is close to the liquid crystal layer,
    wherein the spacers are configured to overlap with the comb tooth part of the second electrode.

2. The liquid crystal cell according to claim 1, wherein the angle between the length direction of the cross section of the spacer and the X-direction of the substrate is about 45° or about 135°.

3. The liquid crystal cell according to claim 2, wherein the second substrate comprises a black matrix and a color resist which are on the side of the second substrate, wherein the first substrate comprises a thin film transistor and a pixel electrode which are on the side of the first substrate, and wherein the spacer is provided proximate the black matrix.

4. The liquid crystal cell according to claim 1, wherein the cross section of the spacer is rectangular.

5. The liquid crystal cell according to claim 1, wherein the first substrate comprises a first electrode on the side of the first substrate, wherein the second substrate comprises the second electrode on the side of the second substrate, and wherein a plurality of liquid crystal lenses are formed in the liquid crystal layer by an electric field between the first electrode and the second electrode.

6. The liquid crystal cell according to claim 5, wherein the spacer is provided at a border between the liquid crystal lenses.

7. The liquid crystal cell according to claim 5, wherein the first electrode and the second electrode are each transparent in a comb shape, or the first electrode is a whole plane transparent electrode and the second electrode is a transparent electrode in a comb shape.

8. The liquid crystal cell according to claim 1, wherein the first substrate or the second substrate comprises a first electrode and the second electrode on the side of the first substrate or the second substrate, and a plurality of liquid crystal lenses are formed in the liquid crystal layer by an electric field between the first electrode and the second electrode.

9. The liquid crystal cell according to claim 8, wherein the spacer is provided at a border between the liquid crystal lenses.

10. The liquid crystal cell according to claim 8, wherein the first electrode and the second electrode are each transparent and in a comb shape, or the first electrode is a whole plane transparent electrode and the second electrode is transparent and in a comb shape.

* * * * *